United States Patent
Yu et al.

(10) Patent No.: US 10,592,315 B2
(45) Date of Patent: Mar. 17, 2020

(54) SOFTWARE CONTAINER MESSAGING MECHANISM

(71) Applicant: General Electric Company, Schenectady, NY (US)

(72) Inventors: Stella Sheung-Ting Yu, San Ramon, CA (US); Clifford A. Collins, Dublin, CA (US); Arash Bannazadeh-Mahani, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 15/688,716

(22) Filed: Aug. 28, 2017

(65) Prior Publication Data

US 2019/0065292 A1 Feb. 28, 2019

(51) Int. Cl.
| | |
|---|---|
| *H04L 29/08* | (2006.01) |
| *G06F 9/54* | (2006.01) |
| *G06F 9/50* | (2006.01) |
| *G06F 9/455* | (2018.01) |

(52) U.S. Cl.
CPC .......... *G06F 9/546* (2013.01); *G06F 9/45558* (2013.01); *H04L 67/16* (2013.01); *G06F 9/5055* (2013.01); *G06F 2009/45579* (2013.01); *G06F 2009/45595* (2013.01)

(58) Field of Classification Search
CPC ......... H04L 67/16; G06F 9/546; G06F 9/5055
USPC ....................................................... 709/206
See application file for complete search history.

(56) References Cited

U.S. PATENT DOCUMENTS

| | | | |
|---|---|---|---|
| 9,256,467 B1* | 2/2016 | Singh | G06F 9/5055 |
| 2018/0083836 A1* | 3/2018 | Kuo | H04L 12/281 |
| 2018/0227369 A1* | 8/2018 | DuCray | H04L 12/2803 |

* cited by examiner

*Primary Examiner* — Minh Chau Nguyen
(74) *Attorney, Agent, or Firm* — Fitch Even Tabin & Flannery LLP

(57) ABSTRACT

Systems and methods for facilitating communication with at least one software container are presented. In an example embodiment, a first messaging client executing on a computing system subscribes to a messaging topic at a messaging broker executing in the system. The subscribing to the messaging topic includes providing an identifier corresponding to the first messaging client. A second messaging client executing on the system publishes a message for the messaging topic to the messaging broker. The messaging broker forwards the published message to the first messaging client based on the subscribing to the messaging topic by the first messaging client. One or both of the first messaging client and the second messaging client execute in corresponding software containers in the system.

16 Claims, 9 Drawing Sheets

SOFTWARE CONTAINER MESSAGING MECHANISM

TECHNICAL FIELD

Embodiments of the present disclosure relate generally to data processing and, more particularly, but not by way of limitation, to a method and system for messaging with one or more software containers.

BACKGROUND

A popular emerging framework for facilitating the execution of multiple software applications on a single computing device is the software container. Prior to containers, multiple virtual machines (VMs) concurrently emulating separate computer systems within a single hardware computer system might be employed. In such examples, each VM provides the environment in which a separate operating system (OS), one or more applications, and any necessary libraries and binary files, may execute, and the VMs interact with the underlying hardware by way of a hypervisor. On the other hand, multiple software containers (e.g., Docker® containers) may execute atop a single container engine, which may operate atop a single OS employed within a hardware computer system. Each container, in turn, may include an application with any binaries and libraries necessary to execute the application, often resulting in each container being much smaller, and starting execution more quickly, than a corresponding VM. Consequently, containers may be more readily employed in smaller client computer systems, and may facilitate a modularized deployment of individual applications within a single computer system.

An additional benefit of containers is the ability to execute applications written in different programming languages so that multiple processes may operate concurrently so that each individual process may be employed using a language most appropriate to its corresponding task. However, the use of multiple separate containers may also complicate the ability of the various applications to communicate with each other between containers, which may be useful in some examples, such as when multiple applications operate on the same set of data.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
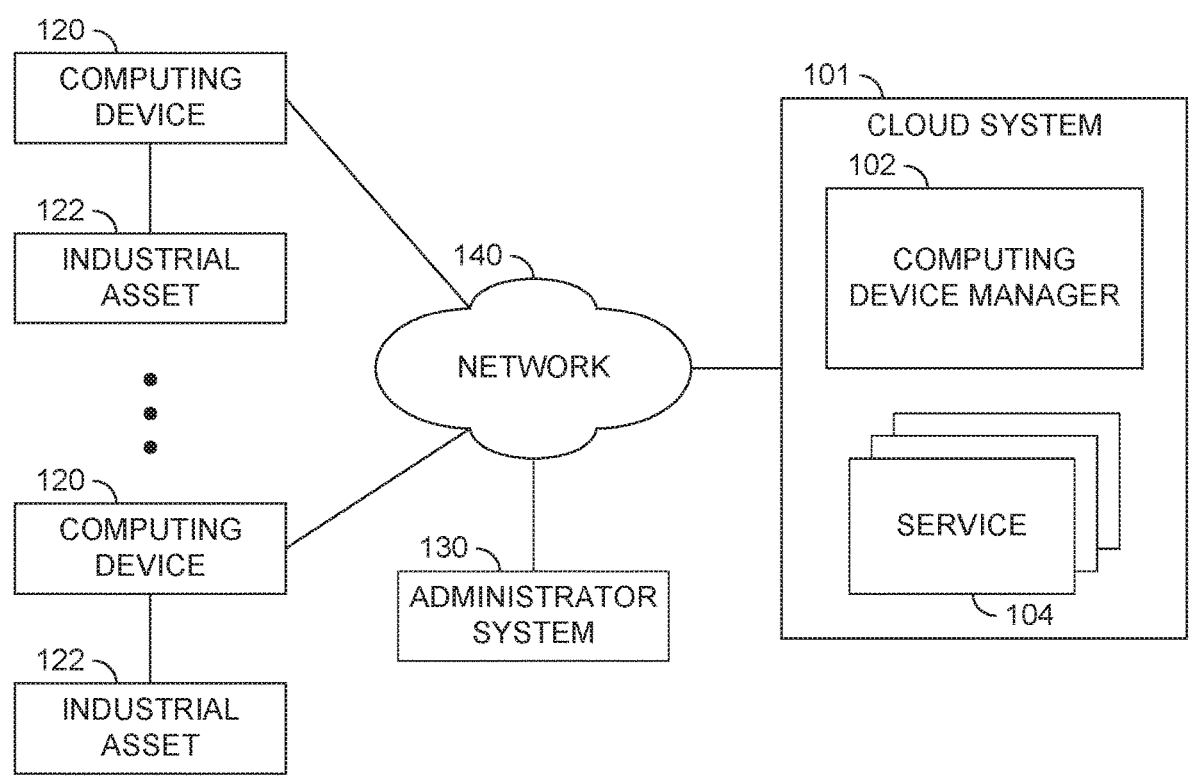
FIG. 1 is a block diagram of an example cloud system communicatively coupled via a network with multiple computing devices and an administrator system.

FIG. 1 is a block diagram of a cloud system 101 including a computing device manager 102 and one or more software services 104 available for use in conjunction with multiple computing devices 120 that are communicatively coupled with the cloud system 101 via a communication network 140. Also depicted in FIG. 1 is an administrator system 130 that is also coupled with the communication network 140. While a single administrator system 130 is shown in FIG. 1, multiple administrator systems 130 may be present in other example embodiments. Moreover, while two (or more) computing devices 120 are explicitly depicted in FIG. 1, many more computing devices 120 may be communicatively coupled to the cloud system 101 and managed via the computing device manager 102, in example embodiments.

Communicatively coupling the computing devices 120 and the administrator system 130 to the cloud system 101 is the communication network 140, such as a wide area network (WAN) (e.g., the Internet). Other types of networks may also be included as part of the network 140, such as a local area network, (LAN), a wireless WAN (WWAN), a wireless LAN (WLAN), a cellular telephone network (e.g., a third-generation (3G) or fourth-generation (4G) network), another communication network or connection, or some combination thereof.

The administrator system 130, in an example embodiment, may be used by a customer of the cloud system 101 to manage the computing devices 120 by communicating with the computing device manager 102 via the administrator system 130. In an example embodiment, the computing device manager 102 may provide a user interface that may be employed by the user via the administrator system 130 (e.g., via a web browser; a desktop computer, laptop computer, tablet computer, or smartphone application; or the like) to access the functionality of the computing device manager 102. In example embodiments, the administrator system 130 may also be employed as a developer system to develop and test software on the cloud system 101 to be executed on the computing devices 120, as well as to perform other functions involving the computing devices 120, but such operations are not described in detail herein to simplify and focus the following discussion.

The computing device manager 102 may be configured to communicate with each of the computing devices 120 to authorize and/or authenticate the computing device 120 for access to the cloud system 101, and to deploy applications and associated services 104 from the cloud system 101 to the computing device 120 for execution thereon. The services 104 available, in example embodiments, may include authorization and authentication services, data transfer services, data processing services, messaging services, database services, and so on. In an example embodiment, the applications and associated services 104 may be placed in one or more software "containers," such as Docker® containers, and then transmitted via the communication network 140 to the computing device 120 for execution thereon by way of a container engine, such as a Docker® engine. The computing device manager 102, in example embodiments, may also initiate operations in the computing devices 120, monitor operational status of the computing devices 120, initiate capture and subsequent processing of sensor data and other data received by the computing devices 120, and so on.

Each of the computing devices 120, in an example embodiment, may be a computing and/or communication system capable of executing an application and associated services 104 provided by and received from the cloud system 101. In a particular example embodiment, the cloud system 101 and each of the computing devices 120 may work cooperatively as components of an industrial Internet, or industrial Internet of Things (IIoT). For example, the cloud system 101 may communicate with one or more computing devices 120 located at one or more industrial sites (e.g., power plants, wind turbines, manufacturing sites, and so on) having one or more industrial assets 122. In such a system, each computing device 120, which may be referred to as an IoT "edge" device, may perform one or more tasks, such as sensor data collection, sensor data processing, data transmission via the communication network 140 to the cloud system 101, industrial asset 122 monitoring and control, and the like. In some example embodiments, each computing device 120 may be managed using the computing device manager 102 of the cloud system 101. In such embodiments, the computing device manager 102 may be viewed as an edge device manager capable of managing the IoT edge devices.

The computing devices 120, in example embodiments, may represent a wide range of processing capability, data storage capacity, and other computing or processing characteristics. Consequently, some such computing devices 120 may be capable of executing a particular application designed to receive and process asset sensor data and to transmit the results via the network 140 to the cloud system 101, while other computing devices 120 may only have the capability of transmitting the received data, or some portion thereof, via the network 140 to the cloud system 101, upon which that same application may execute to perform the desired processing. Consequently, each computing device 120 may represent a particular mix of attributes, such as type of computing device 120, current software version deployed on the computing device 120, current operational status of the computing device 120, and so on. Thus, by employing software containers to transport individual software applications, as well as various binary and library files employed by those applications, from the computing device manager 102 over the network 140 for deployment to particular computing devices 120, the computing device manager 102, may manage each of the various computing devices 120 with an increased level of individual attention.

Figure 2:
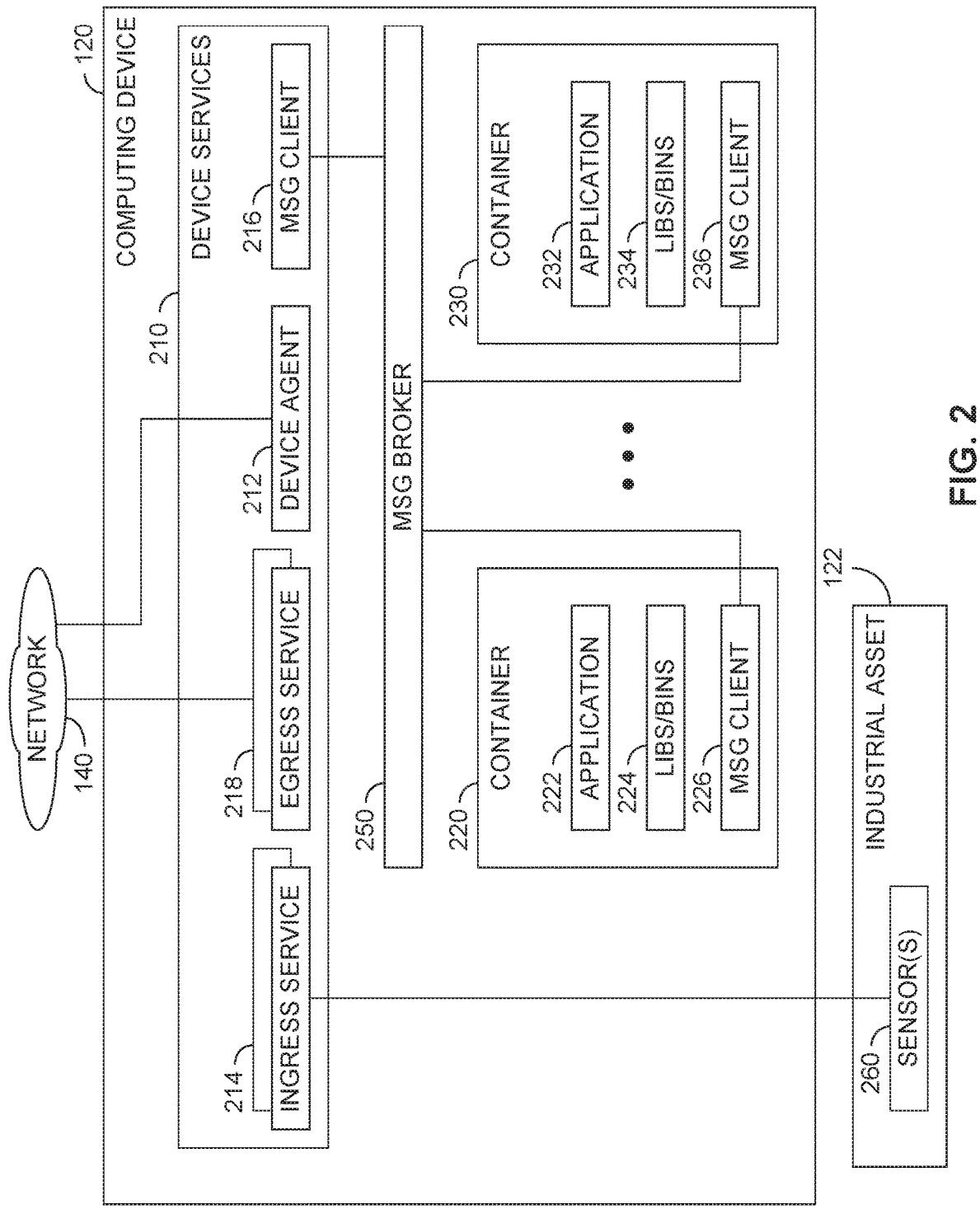
FIG. 2 is a block diagram of an example computing device of the cloud system of FIG. 1.

FIG. 2 is a block diagram of an example embodiment of the computing devices 120 of FIG. 1. As illustrated in the example embodiment of FIG. 2, the computing device 120 may include software containers 220, 230, each of which may include a corresponding application 222, 232, along with corresponding binary and library files 224, 234 used by the applications 222, 232. Also included is one or more device services 210. The computing device 120 may include other modules or components, but such modules and components are not depicted in FIG. 2 to simplify the following discussion. For example, the computing device 120 may include a container engine executing atop an operating system of the computing device 120, in which the container engine is configured to execute the applications 222, 232 located inside the software containers 220, 230.

Generally, the device services 210 may provide services and functionality that facilitate the overall operation of the computing device 120, such as execution of commands (e.g. reception, deployment, configuration, and control of software containers 220, 230) received from the computing device manager 102 via the network 140; return of status information, sensor data, and the like; processing of sensor data; and so on. As depicted in the example embodiment of FIG. 2, the device services 210 include a device agent 212, an ingress data service 214, and an egress data service 218. In an example embodiment, one or more of the device agent 212, the ingress data service 214, the egress data service 218, and any other device service 210 may be incorporated into one or more software containers different from the software containers 220, 230.

In an example embodiment, the device agent 212 may be configured to initialize and configure the computing device 120 for normal operations, as performed primarily by the applications 222, 232. For example, each of the applications 222, 232, having been packaged inside their corresponding containers 220, 230 by the computing device manager 102, along with their associated binary/library files 224, 234, are transmitted by the computing device manager 102 over the network 140 to the device agent 212, which then installs the containers 220, 230 into a memory of the computing device 120. The device agent 212 may also initiate execution of the applications 222, 232, such as in response to a corresponding command received from the computing device manager 102. The device agent 212 may also be tasked with monitoring the operational status of the applications 222, 232, storing ("caching") and updating the configurations of the applications 222, 232, and so on.

The ingress data service 214, in an example embodiment, is configured to receive data, such as data captured from one or more sensors 260 of an industrial asset 122, and either forward the data to an application 222, 232 for further processing, or to the egress data service 218 for transmission to the cloud system 101, wherein one or more services 104 may process the data. In an example embodiment, the ingress data service 214 may receive data via an OPC UA (Open Platform Communications Unified Architecture) industrial protocol connection, a Modbus® serial industrial protocol connection, and the like. In some example embodiments, more than one ingress data service 214 may be present, as indicated in FIG. 2, such as one ingress data service 214 for each of multiple communication protocols.

In an example embodiment, the egress data service 218 may be configured to receive data, such as sensor data forwarded by the ingress data service 214 or data processed by an application 222, 232, and transmit the data over the communication network 140 to one or more services 104 of the cloud system 101 for processing and/or analysis. In example embodiments, the egress data service 218 may transmit data to the cloud system 101 using one or more communication protocols, such as Hypertext Transfer Protocol (HTTP), WebSocket protocol, and so forth. Moreover, as shown in FIG. 2, more than one egress data service 218 may be employed, such as one egress data service 218 for each separate communication protocol implemented.

In example embodiments discussed below, the computing device 120 incorporates a messaging mechanism that facilitates communication between one or more of the applications 222, 232 of the containers 220, 230, as well as between an application 222, 232 and a device service 210. The messaging mechanism is facilitated by way of a message broker 250 that may be configured to receive subscriptions to a plurality of message "topics" or subjects, as well as a plurality of "published" messages directed to specific ones of the topics, resulting in those messages being forwarded to the subscribers of those topics. In an example embodiment, the message broker 250 may be installed on the computing device 120 prior to installation at a customer premises, installed by the device agent 212 when received from the computing device manager 102 via the network 140, or via other means. In example embodiments, the message broker 250 may provide one or more message queues for different topics, a subscription list of the various subscribers (e.g., applications 222, 232) for each topic, and so on. The message broker 250 may also provide a hierarchical topic structure by which main topics (e.g., "command," "commandStatus," "configs," "cacheConfigs," and so on) may have subtopics, or topic "tags," individually identifying particular messaging entities (e.g., one of the applications 222, 232, the device agent 212, the ingress data service 214, or the egress data service 218), such that a messaging entity may subscribe to one or more topics or subtopics. In an example embodiment, the message broker 250 may be a broker implementing the MQTT (Message Queuing Telemetry Transport) protocol, such as the Mosquitto® open-source messaging broker.

To interface with the messaging broker 250, each container 220, 230 may include a messaging client 226, 236 configured to communicate with the messaging broker 250. In addition, the device services 210 may include one or more messaging clients 216 to facilitate communication between the device agent 212, the ingress data service 214, and/or the egress data service 218, and one or more of the applications 222, 232. In an example embodiment, each messaging client 216, 226, 236 may provide one or more application programming interfaces (APIs) to facilitate an application 222, 232 or other messaging entity to subscribe to one or more particular topics, receive messages to subscribed topics, publish messages to one or more topics, and so on. In other example embodiments, the functionality of the messaging clients 216, 226, 236 may be incorporated within their corresponding device agent 212, ingress data service 214, egress data service 218, or application 222, 232.

In example embodiments, each message may include an identifier for the messaging client 216, 226, 236 publishing the message (or a messaging entity, such as an application 222, 232 associated with the messaging client 216, 226, 236), an identifier for the message, a type of the message (e.g., a command message, a command status message, binary data (e.g. sensor data) (or array data) message), a topic to which the message is to be published, and so forth. Such information may be packaged in a message data object for transfer between the messaging broker 250 and the messaging clients 216, 226, 236.

In an example embodiment, the messaging broker 250 is configured to trust all messaging clients 226, 236 associated with applications 222, 232 located in containers 220, 230 installed in the computing device 120, as well as those associated with messaging clients 216 corresponding to the device services 210, and to not trust any other messaging clients that may attempt to subscribe or publish to any topics in the computing device 120. Consequently, authorization within the computing device 120 (e.g., among the messaging clients 216, 226, 236 and the messaging broker 250) may not be expected in such example embodiments.

Figure 3:
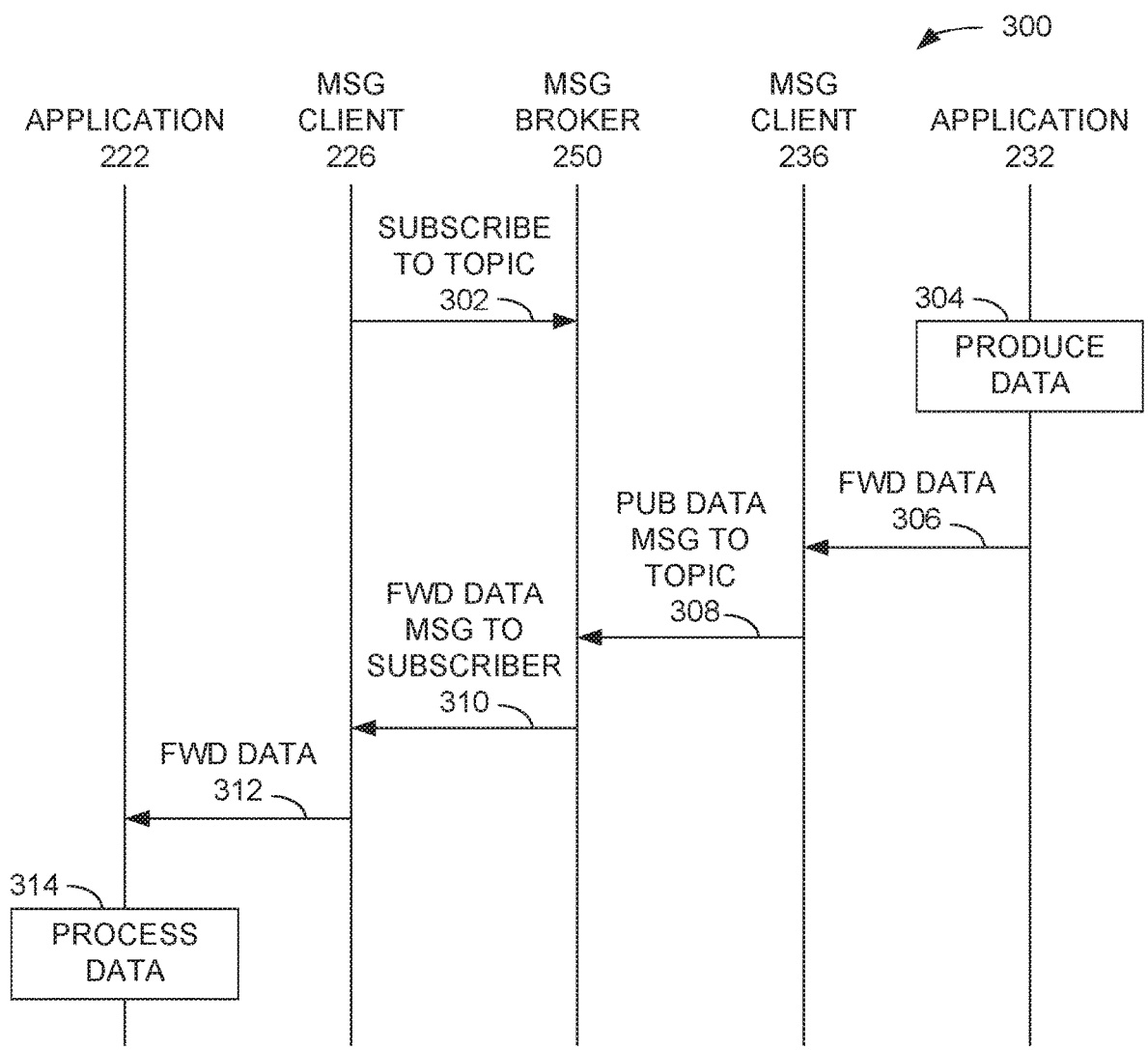
FIG. 3 is a communication diagram of an example method of communicating between applications executing within separate software containers.

FIG. 3 is a communication diagram 300 of an example method of communicating between applications 222, 232 executing within separate software containers 220, 230. While the method depicted in the communication diagram 300, as well as other methods presented herein, is described in conjunction with the computing device 120, other components, devices, or systems may be utilized to perform these methods in other embodiments.

In the communication diagram 300, the messaging client 226 corresponding to the application 222 of the container 220 may subscribe to a particular messaging topic at the messaging broker 250 (operation 302). In an example embodiment, the messaging client 226, as part of the subscribing operation, indicates a higher level topic of "data" and a subtopic or tag of "adjustedTemperature" (e.g., "data/adjustedTemperature"). Consequently, the messaging client 226 is subscribing to temperature data that has been previously adjusted by another application (e.g., application 232 of container 230). Consequently, the subtopic, either via an application identifier or by way of an alphanumeric topic tag identifier, may refer to a particular application or other messaging entity. Moreover, in at least some embodiments, the subscribing operation may also include an identifier for the application 222 and/or the container 220. In response, the messaging broker 250 may store information that facilitates forwarding messages received for that particular topic to the application 222 via the corresponding messaging client 226. Also in an example embodiment, the application 222 may request the messaging client 226 to perform the subscribing operation.

The application 232 may generate data (e.g., adjusted temperature data for one or more time periods) (operation 304) to be further processed (e.g., averaged, compared to historical temperature data, etc.) by the application 222. Accordingly, the application 232 may forward the data (operation 306) to the corresponding messaging client 236, which may then publish the data as one or more messages to the associated topic (e.g., the "data/adjustedTemperature" topic) via the messaging broker 250 (operation 308). In turn, the messaging broker 250 may forward the one or more messages to one or more subscribers of the same topic (e.g., the application 222) (operation 310) via the corresponding messaging client 226, which then forwards the data (operation 312) to the application 222 to be further processed by the application 222 (operation 314).

In other example embodiments, more than one messaging client 216, 226, 236 may subscribe to, or publish to, a particular messaging topic, while any particular messaging client 216, 226, 236 may subscribe to, or publish to, more than one topic.

While the operations 302-314, as well as the operations of other methods described herein, are shown as being performed in a particular order, other orders of execution, including simultaneous, concurrent, or overlapping execution of two or more operations, are possible in other example embodiments.

Figure 4:
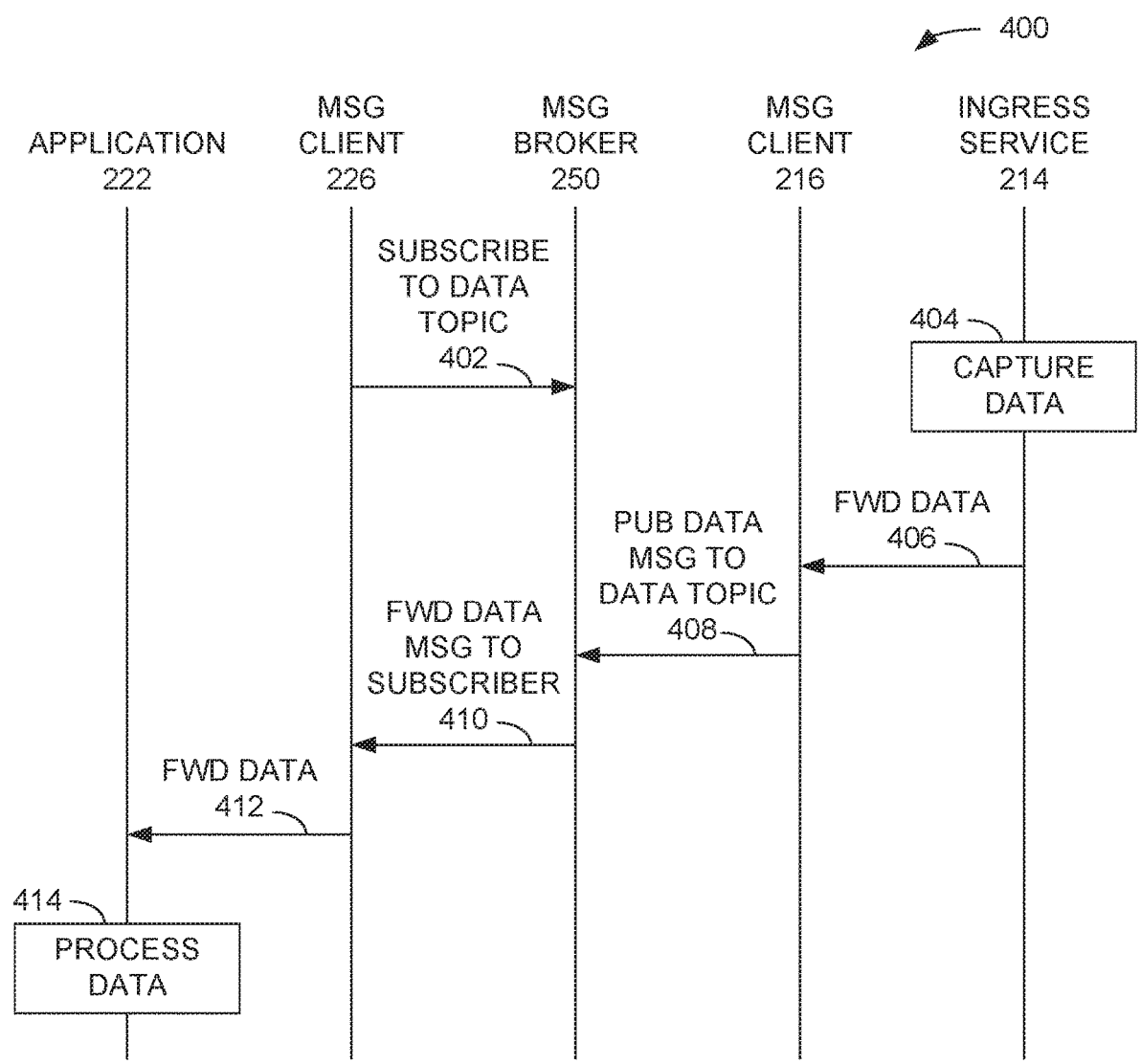
FIG. 4 is a communication diagram of an example method of communicating data between a containerized application and an ingress data service.

FIG. 4 is a communication diagram 400 of an example method of communicating data between a containerized application 222 and the ingress data service 214. To receive such data, the messaging client 226, possibly at the behest of the application 222, may subscribe to the particular data topic (e.g., "data/rawTemperature") by which the data is to be received (operation 402) via the messaging broker 250. The data (e.g., raw temperature data received from one or more of the sensors 260 of an industrial asset 122 coupled with the computing device 120) is received or captured at the ingress data service 214 (operation 404). In response to receiving the data, the data ingress service 214 may forward the data to its corresponding messaging client 216 (operation 406), which may then publish the data in one or more messages via the messaging broker 250 (operation 408). In response to the publication, the messaging broker 250 may then forward the message to the one or more messaging entities (e.g., the application 222) via the appropriate messaging client 226 (operation 410), which then forwards the included data to the application 222 (operation 412), where that data may be processed (operation 414).

Figure 5:
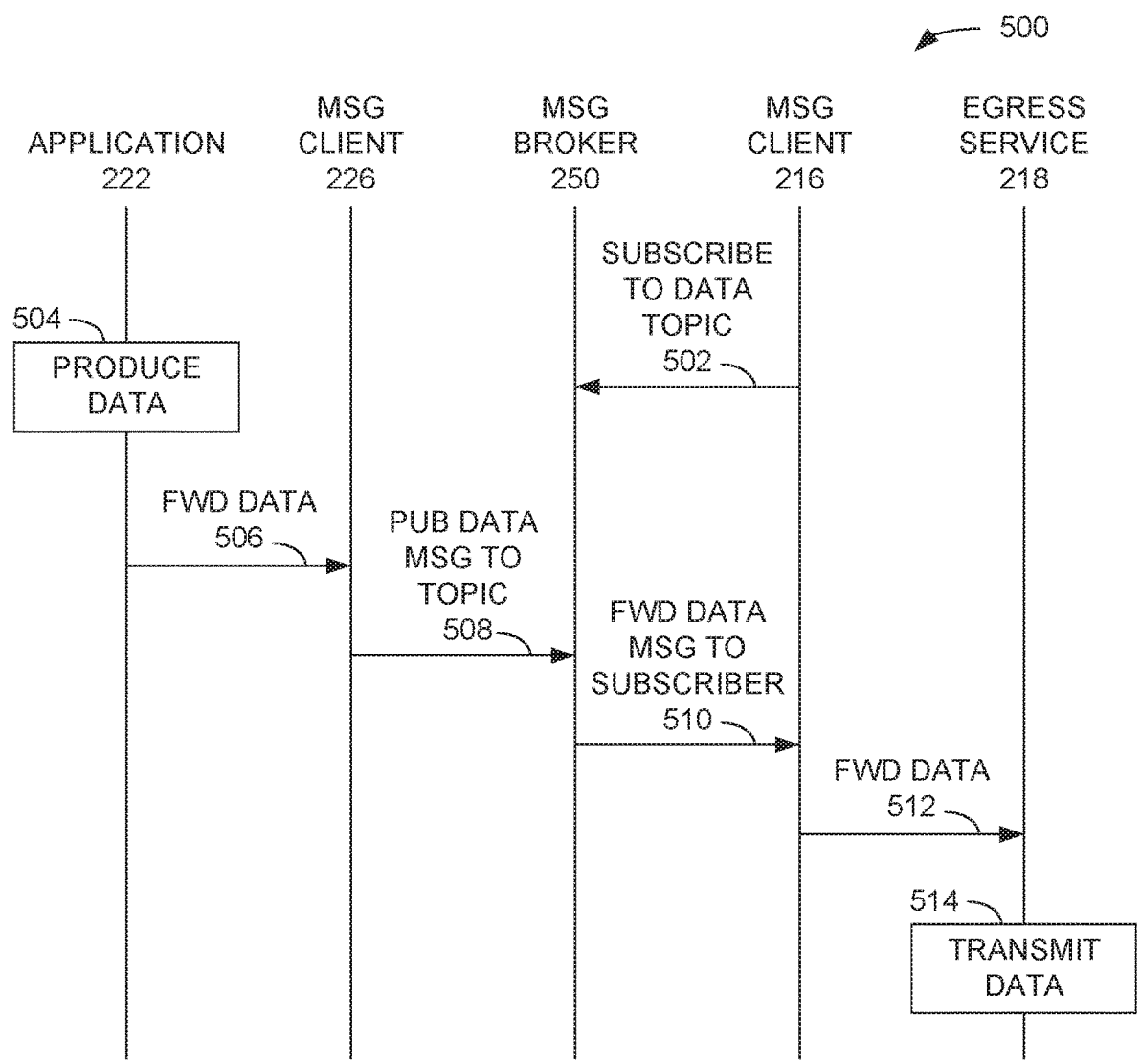
FIG. 5 is a communication diagram of an example method of communicating data between a containerized application and an egress data service.

FIG. 5 is a communication diagram 500 of an example method of communicating data (e.g., processed temperature data) between a containerized application 222 and the egress data service 218. To receive such data, the messaging client 216, possibly at the request of the egress data service 218, may subscribe to the specific data topic of interest (e.g., "data/processedTemperature") by which the data is to be received (operation 502) via the messaging broker 250. The data (e.g., raw temperature data previously received from the ingress data service 214) is processed or produced at the application 222. (operation 504). In response to producing the data, the application 222 may forward the data to its corresponding messaging client 226 (operation 506), which may then publish the data in one or more messages via the messaging broker 250 (operation 508). In response to the publication, the messaging broker 250 may then forward the message to the one or more messaging entities (e.g., the egress data service 218) via the appropriate messaging client 216 (operation 510), which then forwards the included data to the egress data service 218 (operation 512). The egress data service 218 may then transmit the received data over the communication network 140 to a service 104 of the cloud system 101 (operation 514) for further processing, analysis, and/or reporting.

In each of the methods associated with the communication diagrams 300, 400, 500 of FIGS. 3, 4, and 5, the messages involved are "data" messages (e.g., messages comprising primarily of industrial data of some form, such as sensor data, or business-related data, such as data upon which business decisions regarding operation and maintenance of the industrial assets 122 may be based). Such messages may be viewed as being transmitted by way of a "data bus" facilitated by the messaging broker 250 and the various messaging clients 216, 226, 236 described above. In some example embodiments, the same messaging broker 250 and the messaging clients 216, 226, 236 may be employed to provide a "management bus" for the various messaging entities of the computing device 120, which may be employed to communicate commands, configuration data, status information, and the like within the computing device 120. In example embodiments, such messages may be associated with "lifecycle" events, such as starting, stopping, upgrading, and restarting containers 220, 230 and associating applications 222, 232, as well as the device services 210.

Figure 6:
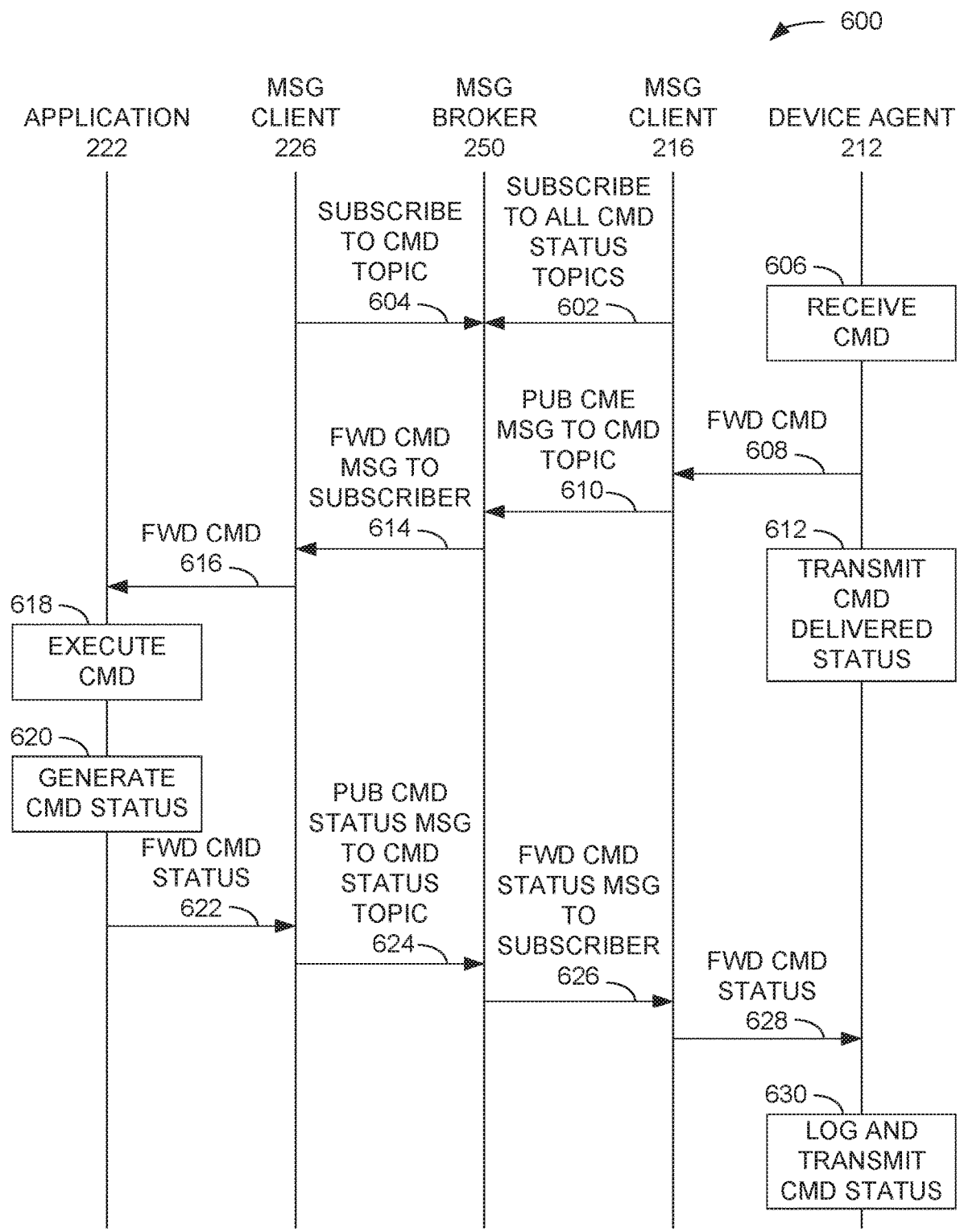
FIG. 6 is a communication diagram of an example method of communicating commands and status between a containerized application and a device agent.

For example, FIG. 6 is a communication diagram 600 of an example method of communicating commands and status between a containerized application 222 and the device agent 212. In an example embodiment, the device agent 212 may be configured to receive commands from the computing device manager 102 intended for one or more of the applications 222, 232 of the computing device 120, as well as to return status regarding those commands to the computing device manager 102. In some example embodiments, the device agent 212 may issue commands and receive status of its own initiative.

In an example embodiment, to facilitate receiving status for commands that have been issued to any application 222, 232 in the computing device 120, the messaging client 216 associated with the device agent 212 may subscribe to a topic that facilitates receiving such status (operation 602). In an example embodiment, the messaging client 216 may subscribe to the topic "commandStatus/#," which may indicate a subscription to messages for a parent topic "commandStatus" that originate from messaging clients 226, 236 corresponding to any application 222, 232 in the containers 220, 230. (For example, the "#" sign may be regarded as a wildcard topic tag matching any subtopic hierarchically related to the "commandStatus" parent topic.) Also, the messaging client 226, possibly in response to a request from the application 222, may subscribe to a command topic for commands to be directed specifically to the application 222 (operation 604). For example, such a topic may be "command/App1," in which "App1" refers to the application 222.

Also in this example method, the device agent 212 may receive a command (operation 606) from the computing device manager 102 via the communication network 140. In other example embodiments, the device agent 2 may generate the command. The device agent 212 may then forward the command (operation 608) to its corresponding messaging client 216, which then publishes the command as one or more messages to the appropriate topic associated with the application 222 to which the command is directed (e.g., "command/App1," as indicated above) via the messaging broker 250 (operation 610). After the device agent 212 forwards the command to the messaging client 216 (operation 608) (or after the associated message is published (operation 610)), the device agent 212 may also transmit a status over the network 140 to the computing device manager 102 to indicate that the command was issued to the intended application 222, 232.

The messaging broker 250, in response to the publication, may then forward the message to the appropriate messaging client 226 that subscribed to the topic to which the message was published (operation 614), which then forwards the included command to the corresponding application 222 (operation 616). In response to receiving the command, the application 222 may then execute the command (operation 618) and generate a status based on the execution of the command (operation 620).

To report the resulting command status, the application 222 may then forward that status to its corresponding messaging client 226 (operation 622), which, in turn, may publish one or more messages that include the status to the appropriate command status topic (operation 624). In an example embodiment, the command status topic in this particular situation may be "commandStatus/App1," indicating that the topic covers messages that include command status from "App1" (e.g., the application 222). The messaging broker 250, in response to the publication, may forward the message to the messaging client 216 associated with the device agent 212 (operation 626) on the basis of the messaging client 216 having subscribed to the "commandStatus/#" topic, thus allowing the messaging client 216 to receive "commandStatus" messages for all applications in the computing device 120, including application 222. The messaging client 216 may then forward the included command status to the device agent 212 (operation 628), which may then log the received command status locally (e.g., in a memory of the computing device 120) and/or transmit the status via the network 140 to the computing device manager 102 (operation 630).

Figure 7A:
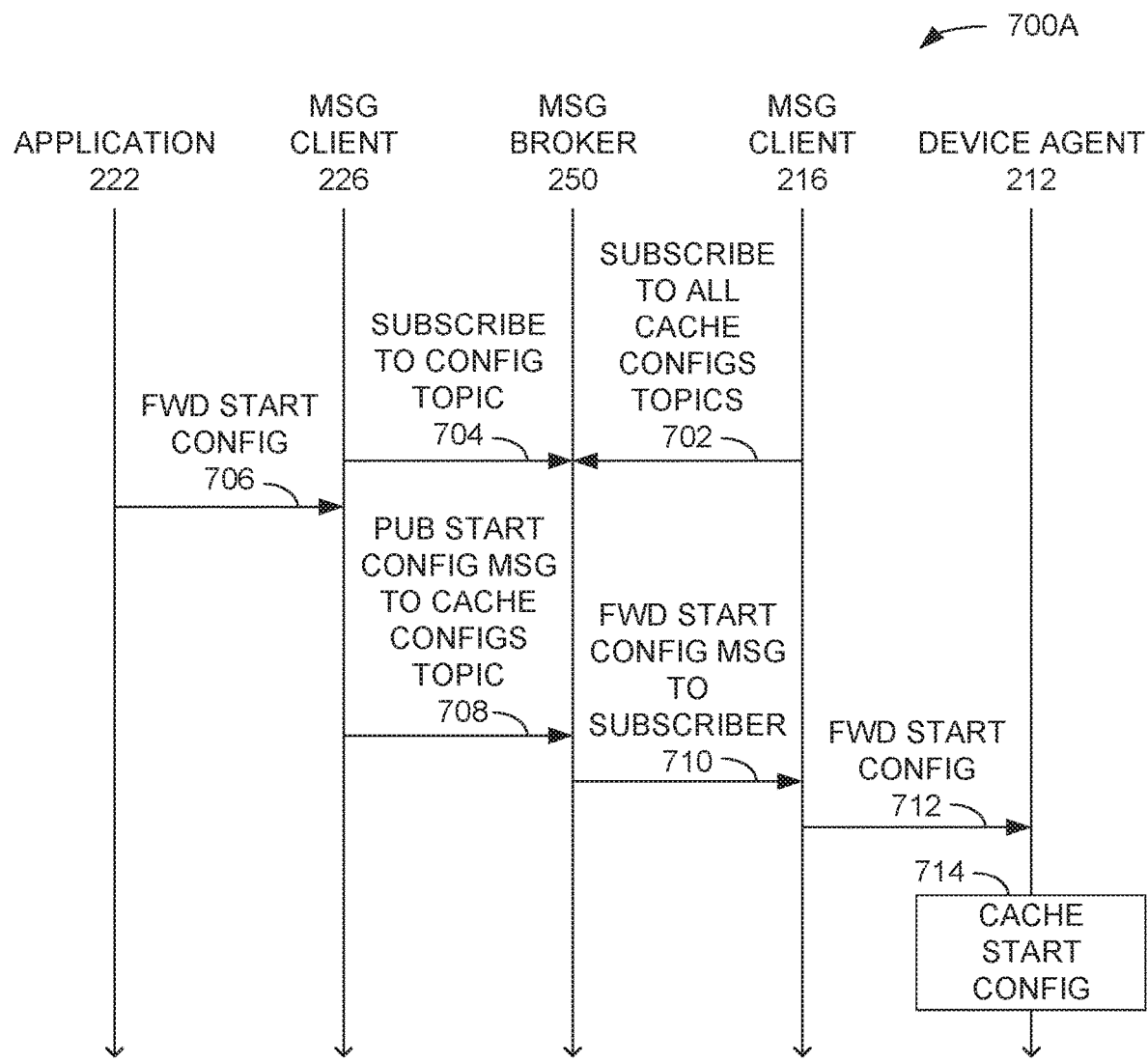
FIGS. 7A and 7B are a communication diagram of an example method of communicating application configurations and associated updates between a containerized application and a device agent.
Figure 7B:
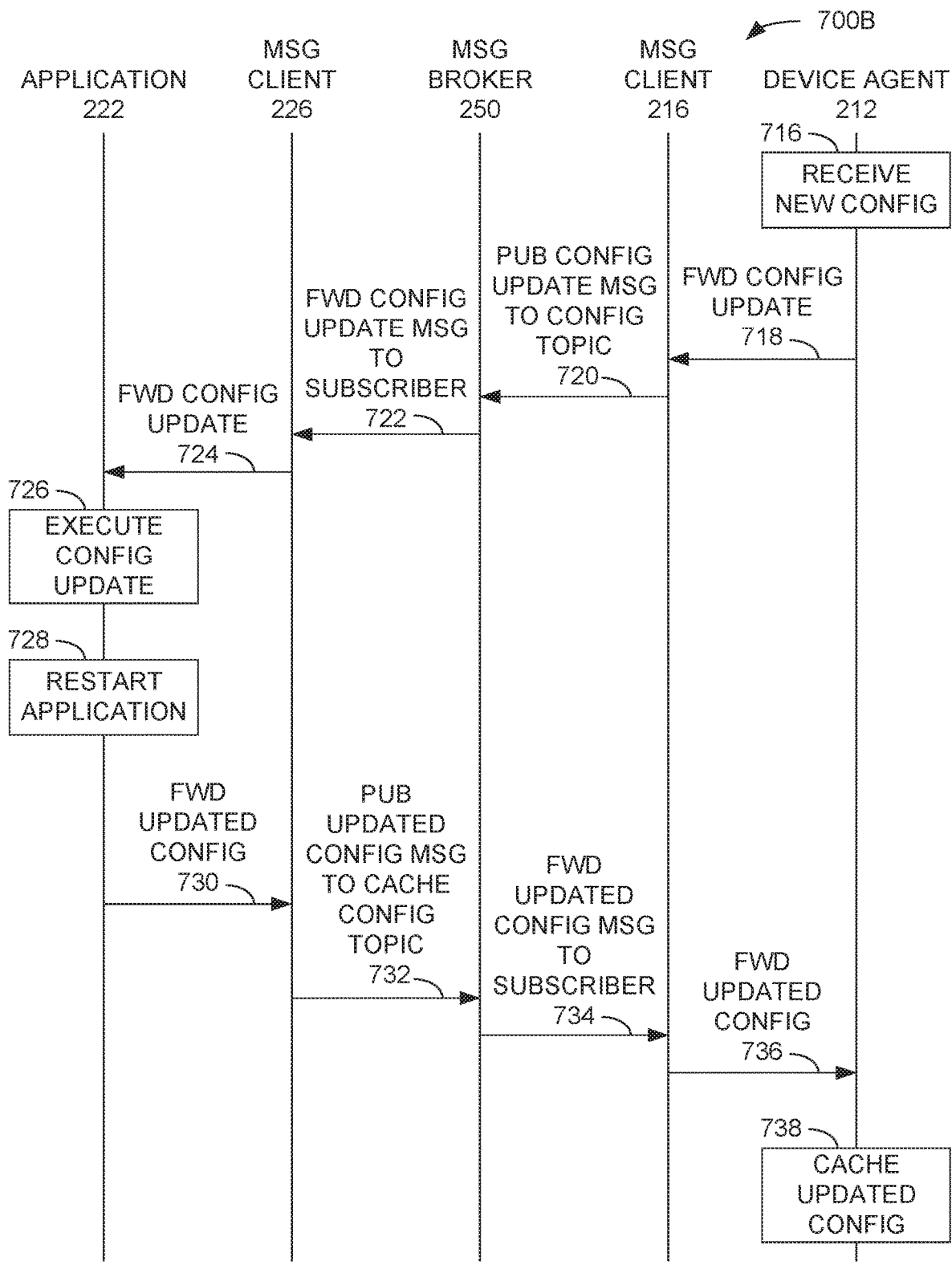

In addition to messages carrying commands and associated status among the various messaging entities of the computing device 120, the messaging broker 250 may also facilitate the transfer of current application 222, 232 configurations, as well as updates for those configurations. FIGS. 7A and 7B collectively present a communication diagram 700A, 700B of an example method of communicating application configurations and associated updates between the containerized application 222 and the device agent 212.

In this example method embodiment, the messaging client 216, possibly at the request of the device agent 212, subscribes to a topic over which all messages that include configurations to be stored or cached locally by the device agent 212 are provided (operation 702). In an example embodiment, the messaging client 216 may subscribe to the topic "cacheConfigs/#," which may indicate a subscription to messages for a parent topic "cacheConfigs" that originate from messaging clients 226, 236 corresponding to any application 222, 232 in the containers 220, 230. (As described above, the "#" sign may serve as a wildcard topic tag matching any subtopic in the "cacheConfigs" parent topic.) Also, the messaging client 226, possibly in response to a request from the application 222, may subscribe to a message topic for configuration updates directed specifically to the application 222 (operation 704). In an example embodiment, such a topic may be "configs/App1," in which "App1" refers to the application 222. Also in an example embodiment, the application 222 or the messaging client 226 may initiate the subscribing operation 704 in response to a startup sequence of the application 222 or associated container 220.

The application 222, possibly in response to an initialization or startup of the application 222, may forward information defining an initial or starting configuration of the application 222 to its corresponding messaging client 226 (operation 706). In response to receiving this configuration, the messaging client 226 may publish one or more messages including that configuration to the particular "cacheConfigs" subtopic associated with the application 222 (e.g., the "cacheConfigs/App1" topic) (operation 708). In response to the publication, the messaging broker 250 may then forward the message to the messaging client 216 associated with the device agent 212 based on the previous subscription of the messaging client 216 to the "cacheConfigs/#" parent topic (operation 710). The messaging client 216 may then forward the configuration information included in that message to the device agent 212 (operation 712). Thereafter, the device agent 212 may cache or store the starting configuration information locally (operation 714), as well as possibly transmitting that information over the communication network 140 to the computing device manager 102.

Continuing with the example method embodiment as depicted in communication diagram 700B of FIG. 7B, the device agent 212 may receive new configuration information for the application 222 (operation 716), such as from the computing device manager 102 over the communication network 140. Based on the new configuration, and possibly on the previously cached configuration for the application 222, the device agent 212 may generate a configuration update and forward that update (operation 718) to its corresponding messaging client 216, which then may publish the update as one or more messages to the appropriate topic associated with the application 222 to which the update is directed (e.g., "configs/App1," as discussed above) via the messaging broker 250 (operation 720).

The messaging broker 250, in response to the publication, may then forward the message to the appropriate messaging client 226 that subscribed to the topic to which the message was published (operation 722), which then forwards the included configuration update to the corresponding application 222 (operation 724). In response to receiving the update, the application 222 may then execute the configuration update (operation 726) and possibly restart the application 222 to render the configuration update effective (operation 728).

To report the resulting updated configuration, the application 222 may then forward the updated configuration to its corresponding messaging client 226 (operation 730), which may then publish one or more messages that include the updated configuration to the appropriate cache configuration topic (operation 732). In an example embodiment, the cache configuration topic under these circumstances may be "cacheConfigs/App1," indicating that the topic covers messages including configurations from "App1" (e.g., the application 222) that are to be cached. The messaging broker 250, in response to this publication, may forward the message to the messaging client 216 associated with the device agent 212 (operation 734) on the basis of the messaging client 216 having subscribed to the "cacheConfigs/#" topic, thus allowing the messaging client 216 to receive "cacheConfigs" messages for all applications in the computing system 120, including application 222. The messaging client 216 may then forward the included updated configuration to the device agent 212 (operation 736), which may then cache or store the received updated configuration for the application 222 locally and/or transmit the updated configuration over the communication network 140 to the computing device manager 102 (operation 738).

While the examples of FIGS. 3-6, 7A and 7B illustrate subscribing and publishing to various messaging topics, these same messaging entities, via their corresponding messaging clients 216, 226, 236, may also unsubscribe from topics to which they have previously subscribed, such as prior to terminating the operation of the device agent 212, the ingress data service 214, the egress data service 218, or one of the applications 222, 232. These unsubscribing operations may occur, for example, prior to loading a new messaging entity from the computing device manager 102 via the network 140. Once the new entity has been loaded and restarted, the entity, via its corresponding messaging client 216, 226, 236, may re-subscribe and/or publish to particular topics of interest, as described above.

In an example embodiment, a method for facilitating communication with at least one software container comprises subscribing to a messaging topic at a messaging broker executing on a computing system by a first messaging client executing on the computing system, the subscribing to the messaging topic comprising providing an identifier corresponding to the first messaging client; publishing a message for the messaging topic to the messaging broker by a second messaging client executing on the computing system using at least one hardware processor; and forwarding the published message by the messaging broker to the first messaging client based on the subscribing to the messaging topic by the first messaging client, wherein each of at least one of the first messaging client and the second messaging client executes in a corresponding software container in the computing system.

In another example embodiment, including all previous example embodiments, the first messaging client executes in a first software container in the computing system, and the method further comprises processing the forwarded message by an application executing in the first software container.

In another example embodiment, including all previous example embodiments, the method further comprises capturing sensor data at an ingress data service executing on the computing system; and receiving the sensor data by the second messaging client, wherein the message comprises the sensor data.

In another example embodiment, including all previous example embodiments, the second messaging client executes in a first software container in the computing system, and the method further comprises transmitting data by an egress data service executing on the computing system over a communication network to a cloud computing system in response to the forwarding of the message, wherein the message comprises the data.

In another example embodiment, including all previous example embodiments, the first messaging client executes in a first software container in the computing system; and the second messaging client executes in a second software container separate from the first software container in the computing system.

In another example embodiment, including all previous example embodiments, the first messaging client executes in a software container, and the method further comprises providing a command for an application executing in the software container by a device agent executing on the computing system, wherein the message comprises the command; and processing the command by the application in response to the first messaging client receiving the forwarded message.

In another example embodiment, including all previous example embodiments, the method further comprises receiving the command by the device agent from a cloud computing system over a communication network; and returning a command delivered status by the device agent over the communication network to the cloud computing system in response to the publishing of the message.

In another example embodiment, including all previous example embodiments, the messaging topic comprises a first messaging topic, the message comprises a first message, and the method further comprises subscribing to a second messaging topic at the messaging broker by the second messaging client, the subscribing to the second messaging topic comprising providing an identifier corresponding to the second messaging client; publishing a second message for the second messaging topic to the messaging broker by the first messaging client, the second message comprising a status of the command processed at the application; forwarding the published second message by the messaging broker to the second messaging client; and logging the status by the device agent from the second messaging client in response to the second messaging client receiving the forwarded second message.

In another example embodiment, including all previous example embodiments, the method further comprises returning the status of the command processed at the application by the device agent over the communication network to the cloud computing system.

In another example embodiment, including all previous example embodiments, the first messaging topic comprises a messaging topic by which only the application receives commands generated by the device agent; and the second messaging topic comprises a messaging topic by which the second messaging client receives status of commands generated by the device agent and processed at each of a plurality of applications executing in a plurality of containers in the computing system.

In another example embodiment, including all previous example embodiments, the second messaging client executes in a software container, the message comprises current configuration information for an application executing in the software container, and the method further comprises storing the current configuration information by a device agent executing on the computing system in response to the first messaging client receiving the forwarded message.

In another example embodiment, including all previous example embodiments, the messaging topic comprises a first messaging topic, the message comprises a first message, and the method further comprises subscribing to a second messaging topic at the messaging broker by the second messaging client, the subscribing to the second messaging topic comprising providing an identifier corresponding to the second messaging client; publishing a second message for the second messaging topic to the messaging broker by the first messaging client, the second message comprising update information for the current configuration information for the application; forwarding the published second message by the messaging broker to the second messaging client; and updating the current configuration information with the update information by the application in response to the second messaging client receiving the forwarded second message.

In another example embodiment, including all previous example embodiments, the method further comprises publishing a third message for the first messaging topic to the messaging broker by the second messaging client, the third message comprising updated configuration information generated by the application resulting from the update; forwarding the published third message by the messaging broker to the first messaging client based on the subscribing to the first messaging topic by the first messaging client; and storing the updated configuration information by the device agent in response to the first messaging client receiving the forwarded third message.

In another example embodiment, including all previous example embodiments, the first messaging topic comprises a messaging topic by which the first messaging client receives current configuration information for each of a plurality of applications executing in a plurality of containers on the computing system; and the second messaging topic comprises a messaging topic by which only the application receives update information for the current configuration information for the application.

In another example embodiment, including all previous example embodiments, the method further comprises receiving the update information for the current configuration information for the application by the device agent from a cloud computing system via a communication network.

In another example embodiment, including all previous example embodiments, the method further comprises restarting the application in response to the updating of the current configuration information with the update information.

In another example embodiment, including all previous example embodiments, the computing system comprises an industrial computing device located at a customer premises, and the method further comprises receiving a device agent at the industrial computing device from a cloud computing system via a communication network; and initiating execution of the device agent at the industrial computing device.

In another example embodiment, including all previous example embodiments, the method further comprises receiving the corresponding software container at the computing system from the cloud computing system via the communication network; and initiating execution of the corresponding software container at the industrial computing device by the device agent.

In an example embodiment, a system comprises one or more hardware processors; and a memory storing instructions that, when executed by at least one of the one or more hardware processors, cause the system to perform operations comprising subscribing to a messaging topic at a messaging broker executing on a computing system by a first messaging client executing on the computing system, the subscribing to the messaging topic comprising providing an identifier corresponding to the first messaging client; publishing a message for the messaging topic to the messaging broker by a second messaging client executing on the computing system; and forwarding the published message by the messaging broker to the first messaging client based on the subscribing to the messaging topic by the first messaging client, wherein each of at least one of the first messaging client and the second messaging client executes in a corresponding software container in the computing system.

In an example embodiment, a non-transitory computer-readable storage medium stores instructions that, when executed by at least one hardware processor of a machine, cause the machine to perform operations comprising subscribing to a messaging topic at a messaging broker executing on a computing system by a first messaging client executing on the computing system, the subscribing to the messaging topic comprising providing an identifier corresponding to the first messaging client; publishing a message for the messaging topic to the messaging broker by a second messaging client executing on the computing system; and forwarding the published message by the messaging broker to the first messaging client based on the subscribing to the messaging topic by the first messaging client, wherein each of at least one of the first messaging client and the second messaging client executes in a corresponding software container in the computing system.

Figure 8:
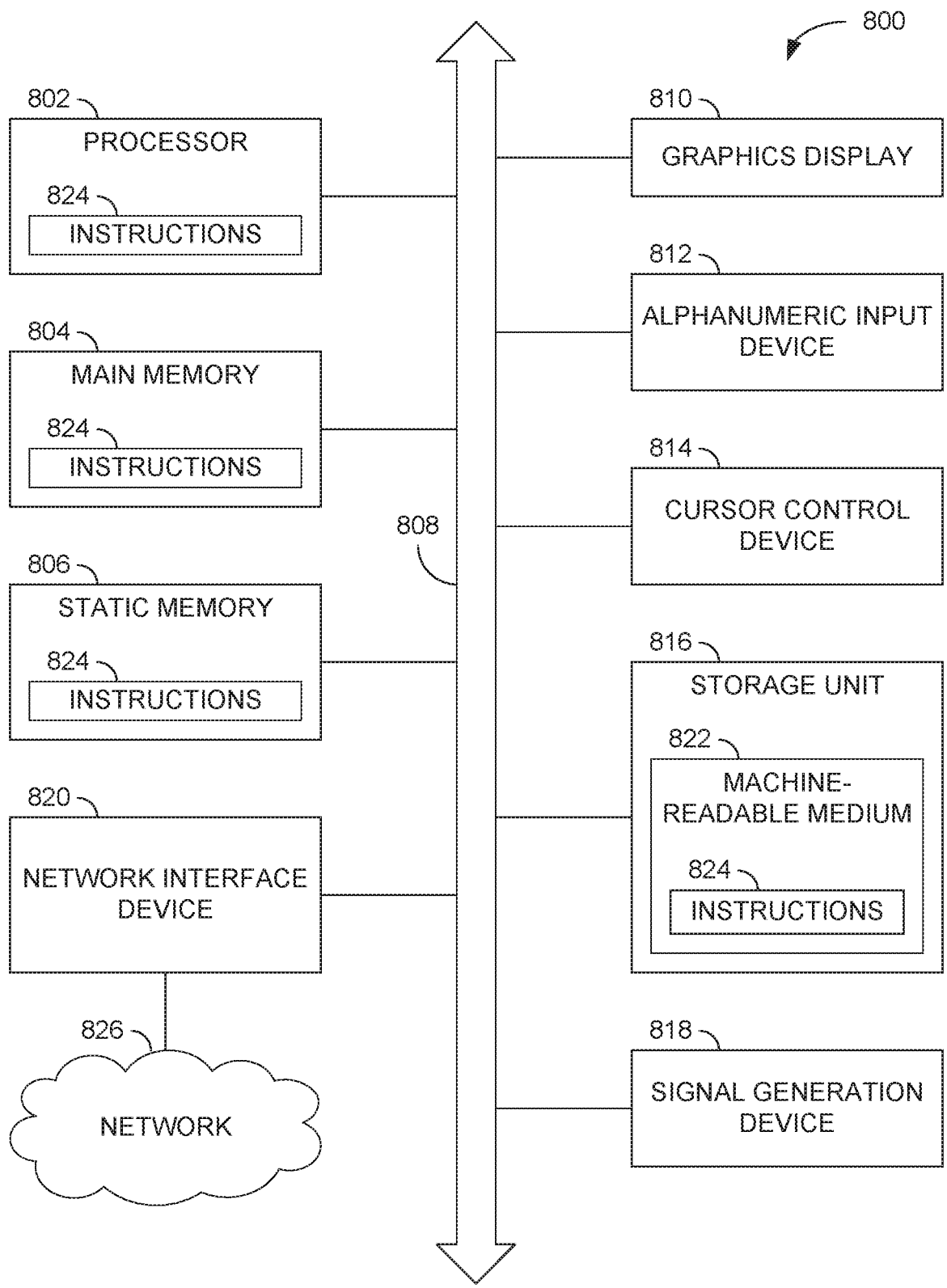
FIG. 8 is a block diagram of a machine or device in the example form of a computer system within which instructions for causing the machine or device to perform any one or more of the methodologies discussed herein may be executed.

FIG. 8 is a block diagram illustrating components of a machine 800, according to some example embodiments, able to read instructions 824 from a machine-readable medium 822 (e.g., a non-transitory machine-readable medium, a machine-readable storage medium, or a computer-readable storage medium) and perform any one or more of the methodologies discussed herein, in whole or in part. Specifically, FIG. 8 depicts the machine 800 in the example form of a computer device (e.g., a computer) within which the instructions 824 (e.g., software, firmware, a program, an application, an apples, an app, or other executable code) for causing the machine 800 to perform any one or more of the methodologies discussed herein, in whole or in part.

For example, the instructions 824 may cause the machine 800 to execute the methods represented in the communication diagrams 300, 400, 500, 600, 700A, and 700B of FIGS. 3 through 6, 7A, and 7B, as well as all example embodiments associated therewith. The instructions 824 can transform the general, non-programmed machine 800 into a particular machine (e.g., specially configured machine) programmed to carry out the described and illustrated functions in the manner described. Also, in example embodiments, the machine 800 may operate as one or more of the modules or components of the computing device 120 of FIG. 1, or any other computing system or device described herein.

In example embodiments, the machine 800 operates as a standalone device or may be connected (e.g., networked) to other machines. The machine 800 may be a server computer, an IIoT gateway, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines 800 that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light-emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible machine-readable storage medium) on which is stored the instructions 824 embodying any one or more of the methodologies or functions described herein. The instructions 824 may also reside, completely or at least partially, within the main memory 804, within the processor 802 (e.g., within a cache memory of the processor 802), or both, before or during execution thereof by the machine 800. Accordingly, the main memory 804 and the processor 802 may be considered machine-readable media 822 (e.g., tangible and non-transitory machine-readable media).

In some example embodiments, the machine 800 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions 824 for execution by a machine (e.g., machine 800), such that the instructions 824, when executed by one or more processors of the machine 800 (e.g., processor 802), cause the machine 800 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 822 is non-transitory in that it does not embody a propagating or transitory signal. However, labeling the machine-readable medium 822 as "non-transitory" should not be construed to mean that the medium is incapable of movement; the medium should be considered as being transportable from one physical location to another in some example embodiments. Additionally, since the machine-readable medium 822 is tangible, the medium may be considered a machine-readable device.

The instructions 824 may further be transmitted or received over a communications network 826 using a transmission medium via the network interface device 820 and utilizing any one of a number of well-known transfer protocols (e.g., Hypertext Transfer Protocol (HTTP)). Examples of communication networks 826 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 822 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for facilitating communication with at least one software container, the method comprising:

subscribing to a first messaging topic and a data topic at a messaging broker executing on a computing system by a first messaging client executing on the computing system, the subscribing to the first messaging topic and the data topic comprising providing identifiers corresponding to the first messaging client;

publishing a first message for the first messaging topic and a second message for the data topic to the messaging broker by a second messaging client executing on the computing system using at least one hardware processor; and forwarding the published first message and the published second message by the messaging broker to the first messaging client based on the subscribing to the first messaging topic and the data topic by the first messaging client, wherein each of at least one of the first messaging client and the second messaging client executes in a corresponding software container in the computing system;

wherein the first messaging client executes in a first software container in the computing system and wherein an application executes in the first software container in the computing system;

wherein the second messaging client executes in a second software container separate from the first software container in the computing system;

wherein a third messaging client, an ingress data service, and a device agent are provided by a device services at the computing system, the device services being separate from the first container and the second container, the third messaging client communicating with the messaging broker;

wherein the first message comprises a command that is received by the device agent from a cloud computing system over a communication network and the command is processed by the application that is executing in the first software container;

wherein the second message comprises sensor data that is captured by the ingress data service;

wherein the messaging broker is configured to trust the first messaging client, the second messaging client, and the third messaging client, but not to trust any other messaging clients that attempt to subscribe.

2. The method of claim 1, wherein a fifth message comprises current configuration information for the application executing in the first software container, and the method further comprises:

storing the current configuration information by the device agent executing on the computing system in response to the first messaging client receiving the fifth forwarded message.

3. The method of claim 2, further comprising:

subscribing to a second messaging topic at the messaging broker by the second messaging client, the subscribing to the second messaging topic comprising providing an identifier corresponding to the second messaging client;

publishing a sixth message for the second messaging topic to the messaging broker by the first messaging client, the sixth message comprising update information for the current configuration information for the application;

forwarding the published sixth message by the messaging broker to the second messaging client; and updating the current configuration information with the update information by the application in response to the second messaging client receiving the forwarded sixth message.

4. The method of claim 3, further comprising:

publishing a seventh message for the first messaging topic to the messaging broker by the second messaging client, the seventh message comprising updated configuration information generated by the application resulting from the update;

forwarding the published seventh message by the messaging broker to the first messaging client based on the subscribing to the first messaging topic by the first messaging client; and storing the updated configuration information by the device agent in response to the first messaging client receiving the forwarded seventh message.

5. The method of claim 3, wherein:

the second messaging topic comprises a messaging topic by which only the application receives update information for the current configuration information for the application.

6. The method of claim 3, further comprising:

receiving the update information for the current configuration information for the application by the device agent from a cloud computing system via a communication network.

7. The method of claim 3, further comprising:

restarting the application in response to the updating of the current configuration information with the update information.

8. The method of claim 1, further comprising:

subscribing to a second messaging topic at the messaging broker by the second messaging client, the subscribing to the second messaging topic comprising providing an identifier corresponding to the second messaging client;

publishing a third message for the second messaging topic to the messaging broker by the first messaging client, the third message comprising a status of the command processed at the application;

forwarding the published third message by the messaging broker to the second messaging client; and logging the status by the device agent from the second messaging client in response to the second messaging client receiving the forwarded third message.

9. The method of claim 8, further comprising:

returning the status of the command processed at the application by the device agent over the communication network to the cloud computing system.

10. The method of claim 8, wherein:

the first messaging topic comprises a messaging topic by which only the application receives commands generated by the device agent; and the second messaging topic comprises a messaging topic by which the second messaging client receives status of commands generated by the device agent and processed at each of a plurality of applications executing in a plurality of containers in the computing system.

11. The method of claim 1, wherein the computing system comprises an industrial computing device located at a customer premises, and the method further comprises:

receiving the device agent at the industrial computing device from a cloud computing system via a communication network; and initiating execution of the device agent at the industrial computing device.

12. The method of claim 11, further comprising:

receiving the first software container and the second software container at the computing system from the cloud computing system via the communication network; and initiating execution of the first software container and the second software container at the industrial computing device by the device agent.

13. The method of claim 1, further comprising:

transmitting data by an egress data service executing at the device services on the computing system over a communication network to a cloud computing system.

14. The method of claim 1, further comprising:

and returning a command delivered status by the device agent over the communication network to the cloud computing system in response to the publishing of the first message.

15. A system comprising:

one or more hardware processors; and a memory storing instructions that, when executed by at least one of the one or more hardware processors, cause the system to perform operations comprising:

subscribing to a first messaging topic and a data topic at a messaging broker executing on a computing system by a first messaging client executing on the computing system, the subscribing to the first messaging topic and the data topic comprising providing identifiers corresponding to the first messaging client;

publishing a first message for the messaging topic and a second message for the data topic to the messaging broker by a second messaging client executing on the computing system; and forwarding the first published message and the published second message by the messaging broker to the first messaging client based on the subscribing to the first messaging topic and the data topic by the first messaging client, wherein each of at least one of the first messaging client and the second messaging client executes in a corresponding software container in the computing system;

wherein the first messaging client executes in a first software container in the computing system and wherein an application executes in the first software container in the computing system;

wherein the second messaging client executes in a second software container separate from the first software container in the computing system;

wherein a third messaging client, an ingress data service, and a device agent are provided by a device services at the computing system, the device services being separate from the first container and the second container, the third messaging client communicating with the messaging broker;

where the first message comprises a command that is received by the device agent from a cloud computing system over a communication network and the command is processed by the application that is executing in the first software container;

wherein the second message comprises sensor data that is captured by the ingress data service;

wherein the messaging broker is configured to trust the first messaging client, the second messaging client, and the third messaging client, but not to trust any other messaging clients that attempt to subscribe.

16. A non-transitory computer-readable storage medium storing instructions that, when executed by at least one hardware processor of a machine, cause the machine to perform operations comprising:

subscribing to a first messaging topic and a data topic at a messaging broker executing on a computing system by a first messaging client executing on the computing system, the subscribing to the first messaging topic and the data topic comprising providing identifiers corresponding to the first messaging client;

publishing a first message for the messaging topic and a second message for the data topic to the messaging broker by a second messaging client executing on the computing system; and forwarding the first published message and the published second message by the messaging broker to the first messaging client based on the subscribing to the first messaging topic and the data topic by the first messaging client, wherein each of at least one of the first messaging client and the second messaging client executes in a corresponding software container in the computing system;

wherein the first messaging client executes in a first software container in the computing system and wherein an application executes in the first software container in the computing system;

wherein the second messaging client executes in a second software container separate from the first software container in the computing system;

wherein a third messaging client, an ingress data service, and a device agent are provided by a device services at the computing system, the device services being separate from the first container and the second container, the third messaging client communicating with the messaging broker;

wherein the first message comprises a command that is received by the device agent from a cloud computing system over a communication network and the command is processed by the application that is executing in the first software container;

wherein the second message comprises sensor data that is captured by the ingress data service;

wherein the messaging broker is configured to trust the first messaging client, the second messaging client, and the third messaging client, but not to trust any other messaging clients that attempt to subscribe.

* * * * *